US012190210B2

(12) United States Patent
Herta et al.

(10) Patent No.: US 12,190,210 B2
(45) Date of Patent: Jan. 7, 2025

(54) CONFIGURABLE AND SCALABLE MACHINE LEARNING MODEL LIFECYCLE OPERATOR

(71) Applicant: International Business Machines Corporation, Armonk, NY (US)

(72) Inventors: Benjamin Herta, Poughquag, NY (US); Darrell Christopher Reimer, Tarrytown, NY (US); Evelyn Duesterwald, Millwood, NY (US); Gaodan Fang, Elmsford, NY (US); Punleuk Oum, Tarrytown, NY (US); Debashish Saha, White Plains, NY (US); Archit Verma, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 17/554,166

(22) Filed: Dec. 17, 2021

(65) Prior Publication Data

US 2023/0196178 A1 Jun. 22, 2023

(51) Int. Cl.
*G06F 9/50* (2006.01)
*G06F 9/48* (2006.01)
*G06N 20/00* (2019.01)

(52) U.S. Cl.
CPC ............. *G06N 20/00* (2019.01); *G06F 9/485* (2013.01); *G06F 9/4887* (2013.01); *G06F 9/5038* (2013.01)

(58) Field of Classification Search
CPC .......... G06N 20/00; G06N 20/20; G06F 9/38; G06F 9/4887; G06F 9/5038; G06F 9/485
See application file for complete search history.

(56) References Cited

U.S. PATENT DOCUMENTS

| | | | | |
|---|---|---|---|---|
| 7,519,566 | B2 | 4/2009 | Prigogin | |
| 10,452,994 | B2 | 10/2019 | Duesterwald | |
| 10,949,764 | B2 | 3/2021 | Shao | |
| 2007/0220034 | A1 | 9/2007 | Iyer | |
| 2020/0104732 | A1 | 4/2020 | Mathew | |
| 2020/0242510 | A1 * | 7/2020 | Duesterwald .......... | G06N 20/00 |
| 2020/0303060 | A1 * | 9/2020 | Haemel .................. | G06N 3/082 |
| 2020/0387836 | A1 * | 12/2020 | Nasr-Azadani ........ | G06N 20/20 |
| 2022/0138004 | A1 * | 5/2022 | Nandakumar ........... | G06N 5/01 718/102 |
| 2022/0164701 | A1 * | 5/2022 | Shrivastava ........ | G06F 21/6218 |

FOREIGN PATENT DOCUMENTS

| | | | |
|---|---|---|---|
| CN | 111026436 | A | 4/2020 |
| RU | 26860061 | C1 | 4/2019 |
| WO | 20201226691 | A1 | 6/2020 |

OTHER PUBLICATIONS

Mell et al., "The NIST Definition of Cloud Computing," National Institute of Standards and Technology Special Publication 800-145, Sep. 2011, 7 pages, United States.

* cited by examiner

*Primary Examiner* — Dong U Kim
(74) *Attorney, Agent, or Firm* — Yee & Associates, P.C.

(57) ABSTRACT

A method of using a computing device to manage a lifecycle of machine learning models includes receiving, by a computing device, multiple pre-defined machine learning lifecycle tasks. The computing device manages executing a management-layer software layer for the multiple pre-defined machine learning lifecycle tasks. The computing device further generates and updates a machine learning pipeline using the management-layer software layer.

17 Claims, 9 Drawing Sheets

400

```yaml
apiVersion: mlmodel.ibm.com/v1alpha1
kind: MLModel
metadata:
  name: mlmodel-cloud2
spec:
  description: "Something to display"
  desiredState: Model Deployment
  tasks:
    - name: testharness-task
      params:
        - name: USE_CP4D
          value: "False"
        - name: MLMODEL_DEFINITION
          value: "loan_application-0.1.4-py3-none-any.whl"
        - name: DATASET
          value: "LoanDataSet"
        - name: DATASET_NAME
          value: "LoanData_with_desc.csv.bz2"
        - name: ENABLE_DATA_REFINERY
          value: "False"
        - name: DATA_ANALYSIS_ALG
          value: "completeness,bias"
        - name: LIMIT_PREDICTIONS
          value: "160"
        - name: ENABLE_SECOND_RUN
          value: "False"
        - name: IBM_CLOUD_IAM_API_KEY_SECRET_NAME
          value: "testharness-secret"
        - name: IBM_CLOUD_IAM_API_KEY_SECRET_KEY
          value: "ibm_cloud_iam_api_key"
        - name: WML_PROD_ENDPOINT
          value: "https://us-south.ml.cloud.ibm.com"
        - name: WML_PROD_ID
          value: "3d48c9d4-de27-4fbc-abd3-9ea3ba6e1abf"
```

Receiving, By A Computing Device, A Plurality Of Pre-Defined Machine Learning Lifecycle Tasks
510

Managing, By The Computing Device, Executing A Management-Layer Software Layer For The Plurality Of Pre-Defined Machine Learning Lifecycle Tasks
520

Generating And Updating, By The Computing Device, A Machine Learning Pipeline By The Management-Layer Software Layer
530

CONFIGURABLE AND SCALABLE MACHINE LEARNING MODEL LIFECYCLE OPERATOR

BACKGROUND

The field of embodiments of the present invention relates to use of a computing model lifecycle management.

Continuous integration/continuous delivery (CI/CD) pipelines are commonly used to codify the sequence of steps that are needed to build and deploy software. The impact of this type of pipeline includes more frequent and reliable updates to software and applications and a more collaborative, agile workflow for DevOps teams. Many tools exist for both the creation CI/CD pipelines and to manage their execution. Tools have emerged targeted specifically at creating pipelines for building and deploying ML Models.

Pipelines are useful to capture a sequence of steps for building and/or deployment. Pipelines, however, cannot cover the end-to-end lifetime of the artifacts that are built or deployed. Pipelines execute and usually cease to exist when all steps in the pipeline have completed. Yet the artifacts created by pipelines can persists across many executions of several distinct pipelines.

SUMMARY

Embodiments relate to use of a computing device to manage a lifecycle of machine learning models. One embodiment provides a method of using a computing device to manage a lifecycle of machine learning models includes receiving, by a computing device, multiple pre-defined machine learning lifecycle tasks. The computing device manages executing a management-layer software layer for the multiple pre-defined machine learning lifecycle tasks. The computing device further generates and updates a machine learning pipeline using the management-layer software layer.

These and other features, aspects and advantages of the present embodiments will become understood with reference to the following description, appended claims and accompanying figures.

BRIEF DESCRIPTION OF THE DRAWINGS

FIG. 4 illustrates an example of an ML model lifecycle specification, according to one embodiment;

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to use of a computing device to manage a lifecycle of machine learning models. One embodiment provides a method of using a computing device to manage a lifecycle of machine learning models includes receiving, by a computing device, multiple pre-defined machine learning lifecycle tasks. The computing device manages executing a management-layer software layer for the multiple pre-defined machine learning lifecycle tasks. The computing device further generates and updates a machine learning pipeline using the management-layer software layer.

Figure 1:
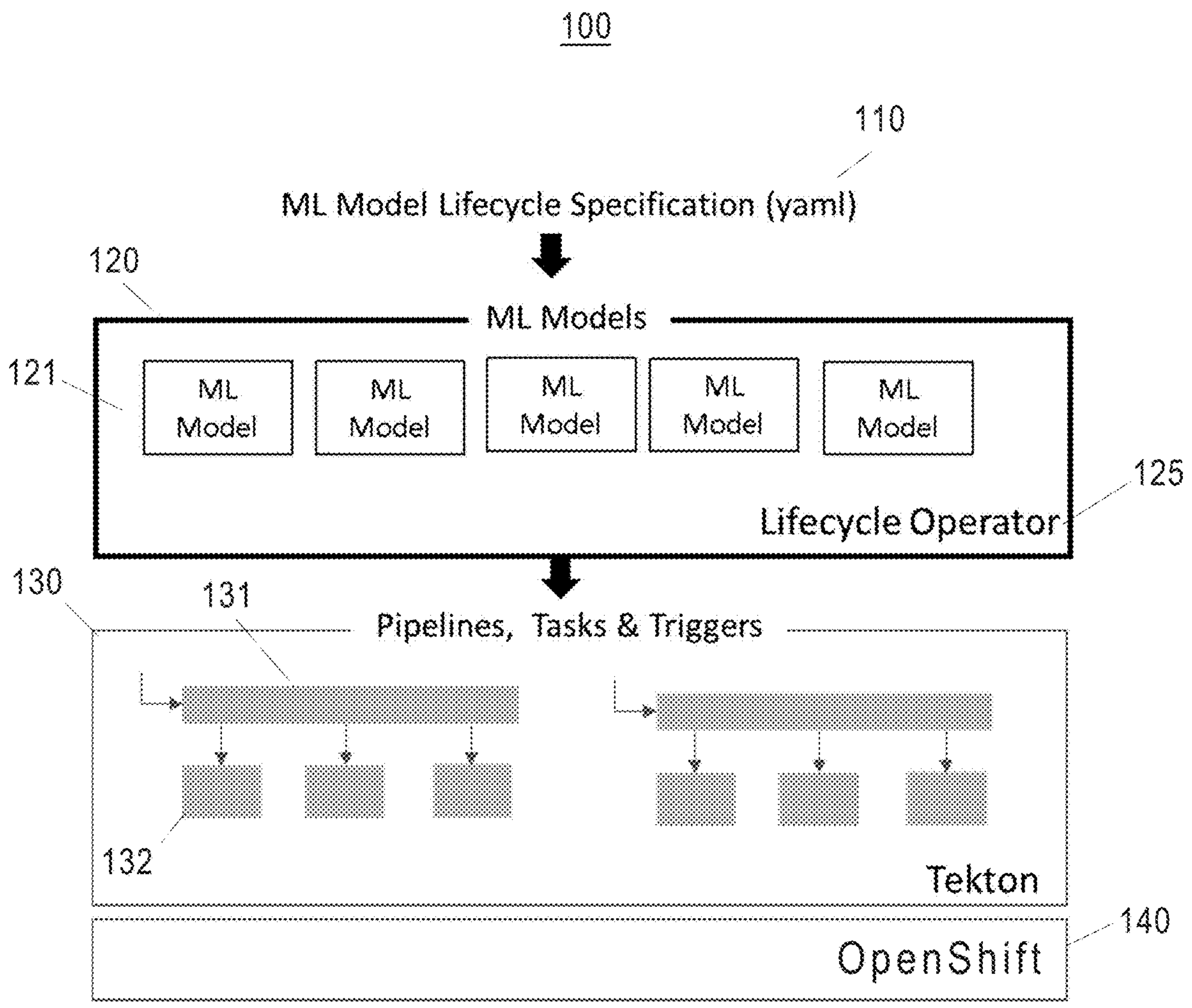
FIG. 1 illustrates an end-to-end (E2E) machine learning (ML) model flow with lifecycle operator, according to one embodiment.

FIG. 1 illustrates an end-to-end (E2E) machine learning (ML) model flow 100 with lifecycle operator 125, according to one embodiment. In one embodiment, the flow 100 includes a ML model lifecycle specification 110 and introduces a management layer 120 with ML models 121 and the lifecycle operator 125 that persist across pipeline 131 executions for the entire lifetime of ML models 120 and all their versions. In some embodiments, the ML model lifecycle specification 110 may be a YAML source, which is a data serialization language for storing information in a human-readable form (YAML originally referred to "Yet Another Markup Language" but has since been referred to as "YAML Ain't Markup Language" to distinguish itself as different from a true markup language).

In some embodiments, the model flow 100 introduces an abstraction for ML models 120 and manages the e2e lifecycle of the ML model 120 instances. The flow 100 is configuration driven based on a specification (the ML model lifecycle specification 110) of the e2e model lifecycle. The flow 100 builds on top of pipelines 131 of the pipelines, tasks and triggers layer 130 where lifecycle stages are operationalized as pipeline tasks 132, and each pipeline 131 execution advances the lifecycle stage of a model 121 version. The ML models 121 persist across many executions of one or more pipelines 131. Some embodiments support model versioning and re-usable components: re-usable lifecycle stage configurations and e2e lifecycle templates. In one or more embodiments, scalability is supported by the flow 100: any number of models 121 and model versions are managed on a single operator instance.

In some embodiments, the flow 100 virtualizes the ML Model 121, and closes the conceptual gap between artificial intelligence (AI) applications and CI/CD pipelines. In one or more embodiments, the flow 100 maps a ML model lifecycle specification 110 to a set of pipelines, tasks and triggers layer 130 (e.g.,Tekton manages the execution of individual pipelines/tasks (Tekton is an open-source, vendor-neutral framework for creating CI/CD systems). The flow 100 provides e2e model lifecycle management and orchestrates the execution of pipelines 131 to manage and maintain ML model 121 state. Some embodiments support model versions, scalability, and re-usable components and lifecycle templates. In one embodiment, a cloud development platform as a service (PaaS) layer 140 may be implemented to create, test, and run applications, and finally deploy them on a cloud environment (e.g., OpenShift, which is an open source cloud-based user-friendly platform that is capable of managing applications written in different languages). One embodiment may be implemented with an OpenShift operator using Tekton pipelines.

In one or more embodiments, the flow 100 provides an ML model 121 lifecycle operator 125 system for managing the lifecycle of ML models 121 and includes a set of pre-defined lifecycle tasks 132, each containing code that knows how to execute a specific stage in the lifecycle of an ML model 121. The flow 100 provides a standard way to add new lifecycle tasks 132 to the flow 100. An ML model lifecycle configuration (file), also referred to a config, specifies a set of those tasks 132, to make up an e2e lifecycle for a particular model instance. The lifecycle operator 125 orchestrates the execution of the tasks 132, pipelines 131 and triggers to manage one or more ML model 121 instances. In one embodiment, the flow 100 provides that the lifecycle operator 125 manages multiple ML model 121 versions for each managed model instance. The flow 100 may further provide that the ML model lifecycle configuration is constructed from a pre-build lifecycle template and includes pre-build lifecycle tasks.

Figure 2:
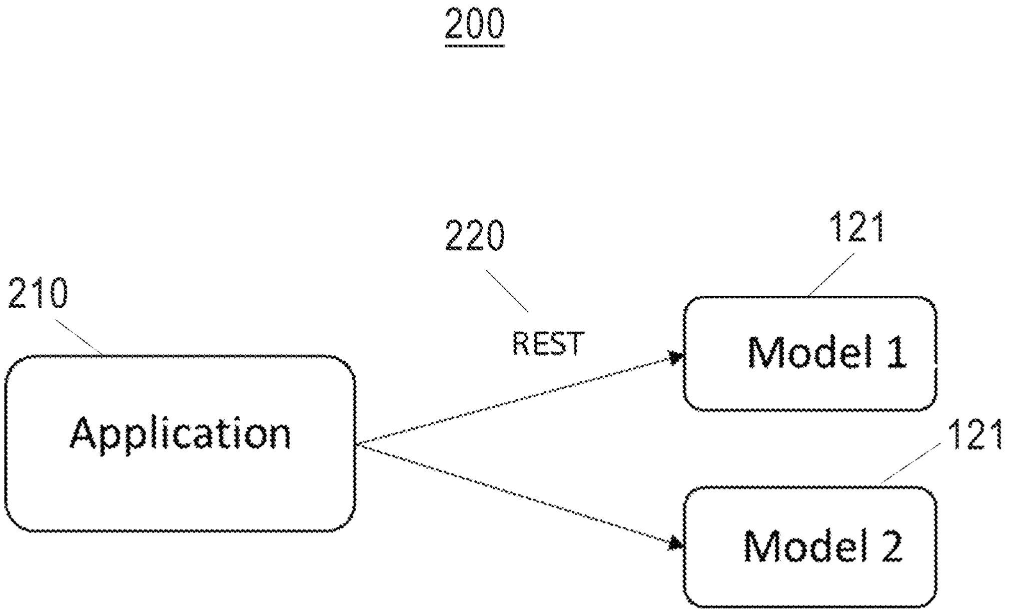
FIG. 2 illustrates a flow for decoupled models deployment through a hosting service where the application and model lifecycle are managed independently, according to one embodiment.
Figure 3:
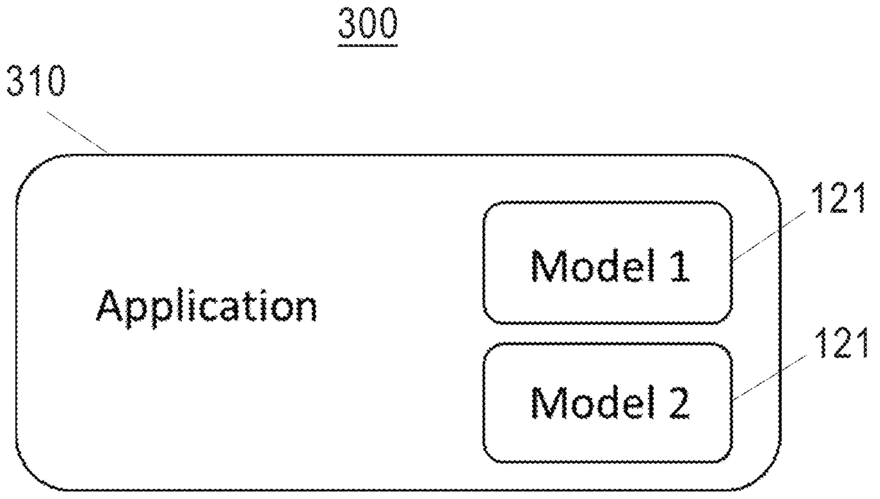
FIG. 3 illustrates shared application and models lifecycle management, according to one embodiment.

FIG. 2 illustrates a flow 200 for decoupled models 121 deployment through a hosting service where the application 210 and model lifecycle are managed independently, according to one embodiment. In some embodiments, the flow 100 (FIG. 1) may employ decoupled lifecycle management where the application 210 and models 121 lifecycle are managed independently. The application 210 CI/CD pipeline is independent of model lifecycle management and the (ML model) lifecycle operator 125 (FIG. 1) covers the model lifecycle e2e. In one or more embodiments, a model 121 is deployed through a hosting service (e.g., Watson ML (WML), etc.) and has a scoring application programming interface (API). The application 210 interacts with its models 121 via the scoring API 220. In one embodiment, the models 121 can be shared across multiple applications FIG. 3 illustrates a flow 300 for shared application 310 and models 121 lifecycle management, according to one embodiment. In some embodiments, the models 121 are trained outside the application 310, and serialized after training and "installed" in the application 310 like other dependencies. In one embodiment, the flow 300 provides that the lifecycle operator 125 (FIG. 1) covers partial model lifecycle (build portion of the lifecycle). In some embodiments, the partial model lifecycle includes hand-over to the application CI/CD pipeline at deployment, usually through a special "deploy" function that passes model binary, possibly triggering CI/CD pipeline application re-build. The partial model lifecycle re-engages in the lifecycle for the next version through retraining triggers. In one or more embodiments, the application CI/CD pipeline covers model operations. In one example embodiment, once a model version has become part of the application 310, the application CI/CD pipeline takes over.

FIG. 4 illustrates an example of an ML model lifecycle specification 400, according to one embodiment. In some embodiments, an end-user (e.g., AI application owner) writes a ML model lifecycle specification 110 (FIG. 1) as a (yaml) configuration file. In one embodiment, there is one (1) configuration for each independent model in the application. Composite models (ensembles) are specified in one configuration. In one or more embodiments, the ML Model lifecycle specification 400 includes: a list of parameterized tasks, where each task represents a lifecycle stage where the 2e2 lifecycle is a composition of tasks, and parameters define tasks inputs; and triggers that when fired initiate task execution where explicit triggers fire based on external events they listen to, and implicit triggers fire on completion of preceding tasks in the lifecycle (e.g., when one tasks consumes an input that is output of another task). One or more embodiments builds on Tekton for tasks and trigger definition and the Tekton runtime for the execution of individual tasks (alternative implementations are possible).

In some embodiments, for pre-built re-usable lifecycle tasks end-users may select from a catalog of re-usable, pre-built tasks, such as: "Train with Watson AutoAI" task, "Deploy on WML" task, "Monitor in Watson Openscale," etc., or they can specify their own custom tasks. In one or more embodiments, pre-built re-usable e2e lifecycle templates provide that end-users may use a pre-built template for their lifecycle specification, the template specifies a particular composition of tasks and triggers to support a common lifecycle pattern. In some embodiments, end-users need to provide only model-specific parameters to instantiate a template.

Returning to FIG. 1, in one or more embodiments, an end-user submits the ML lifecycle configuration (file) to the lifecycle operator 125. Upon receiving an ML model lifecycle configuration, the lifecycle operator 125 performs validation that the specified lifecycle tasks 132 exist in the cluster and have the correct arguments specified. The lifecycle operator 125 creates an ML model 121 instance and initializes associated state information. The lifecycle operator 125 further creates one or more triggers as specified in the configuration and registers them with the underlying trigger service (e.g., Tekton Triggers, etc.). Additionally, the lifecycle operator 125 creates and runs a pipeline 131 of tasks 132 on the underlying pipeline service (e.g., Tekton Pipelines, etc.) to bring the just created ML model instance into a desired state, as specified in the configuration.

In some embodiments, for a managed ML model lifecycle, the ML model's 121 lifecycle advances through the execution of pipeline 131 tasks 132, until the desired state is reached, and the pipeline 131 completes. Once in the desired state, further pipeline 131 executions are launched when the user modifies the desired state, or by the configured triggers. Throughout the ML model lifecycle, the lifecycle operator 125 provides state information for all managed models 121 to the end user upon request. Model 121 state is maintained by actively monitoring the underlying pipeline service (e.g., Tekton, etc.) for all running or completed pipelines 131 associated with each managed model 121. Pipelines 131 launched by the lifecycle operator 125 directly due to user modifications to the desired state are handled the same way as pipelines 131 launched by triggers. If new model 121 versions are built to replace previous versions, the status information for that model 121 reflects the latest revision. Historical information is managed separately. When the end user deletes a ML model 121 instance, the lifecycle operator 125 removes all associated triggers and state information, and launches an optional cleanup pipeline 131 to remove remnants from dependent systems.

In one or more embodiments, regarding model instances versus ML model version, a lifecycle manager process creates one ML model 121 instance for each processed model lifecycle configuration. An ML model 121 instance refers to an ML model that takes a set of inputs and produces a prediction as a response. How the model works internally may likely change over time as the model is updated with new data and new algorithms. How the ML models 121 are built, tested, and monitored is handled by the tasks 132 of the pipelines 131 that define their lifecycle stages. Any single ML model instance may be made up of multiple internal ML models 121 that work together or even compete with each other internally (e.g., in an ensemble).

In some embodiments, for ML model 121 versions, ML model 121 build and deployment stages in the lifecycle may for example: creation of a new version of the ML model 121, archiving of old ML model 121 versions and replacing them with the new versions, or keeping both old and new ML model 121 versions live in order to support gradual migration to the new ML model 121 version. From the perspective of the lifecycle manager process, all versions of an ML model 121 constitute one ML model 121 instance, moving through one set of lifecycle stages. In this way, one lifecycle manager process may support many different approaches to ML model 121 versions. In some embodiments, the flow 100 provides for monitoring external dependencies and launches pipelines 131 containing a subset of the tasks 132, in order to update the ML model 121 instances as needed. In one example embodiment, the ML model 121 instance may have a trigger defined to monitor the original ML model 121 training data, and when the training data is modified, a new pipeline 131 is launched to execute the stages from data checkout through the final stage.

One or more embodiments provide for arbitrary configurable lifecycle stages, with arbitrary triggers at any stage. Longer-lived static ML models 121 are refreshed based on changes to the inputs that created it, not changes to available inputs used in scoring. Some embodiments enable cloud-based management of many ML models 121 deployed anywhere (since the embodiment lifecycle stages are pluggable, they can deploy to local or remote destinations), leveraging cloud resources for execution of lifecycle stages. One or more embodiments handle relatively static models, and is/are centrally driven. One example embodiment provides pluggable arbitrary lifecycle stages for ML models 121. Some embodiments handle a large number of different ML models 121, each with their own defined lifecycle stages and triggers that drive updating the ML models 121 as they occur. Distinguishable from conventional systems, some embodiments have the flexibility to manage many different ML models 121, and they leverage cloud resources to execute the different lifecycle stages (data analysis, pre-processing, training, evaluation, deployment, monitoring, etc.).

Figure 5:
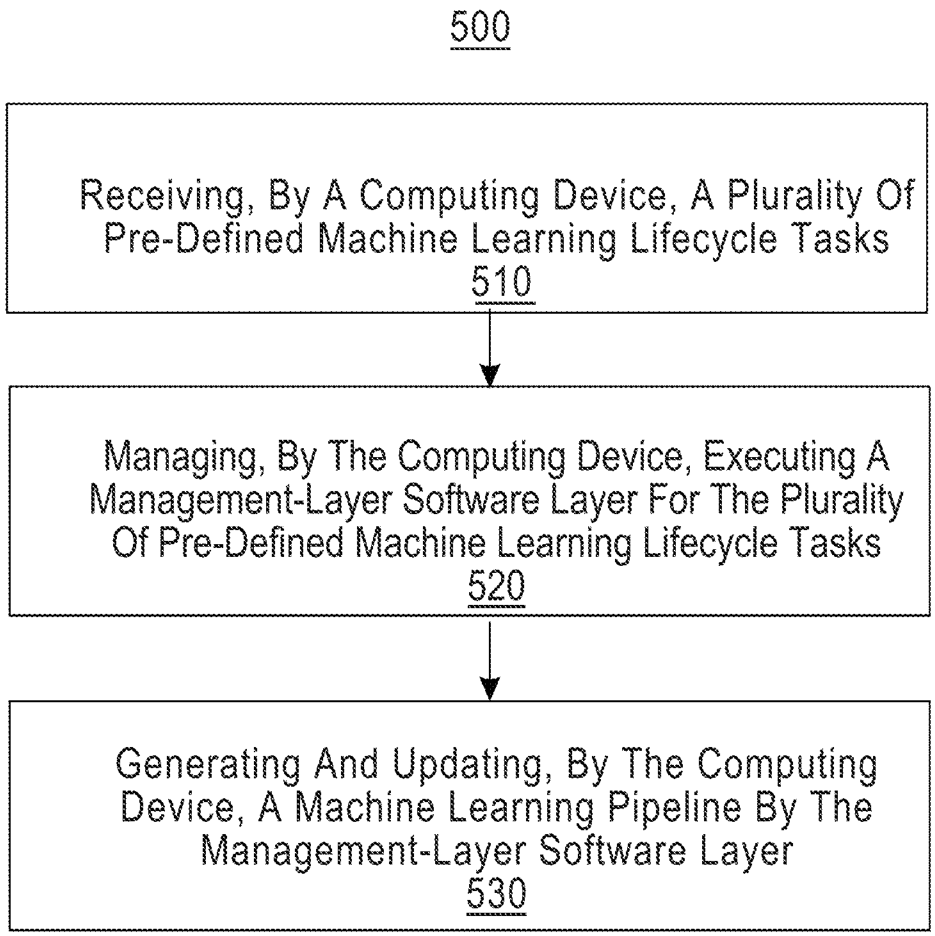
FIG. 5 illustrates a process for using a computing device to manage a lifecycle of machine learning models, according to an embodiment.

FIG. 5 illustrates a process 500 for using a computing device to manage a lifecycle of machine learning models, according to an embodiment. In one embodiment, in block 510 process 500 receives, by a computing device (e.g., from computing node 10, FIG. 6, hardware and software layer 60, FIG. 7, processing system 800, FIG. 8, system 900, FIG. 9, system 1000, FIG. 10, etc.), multiple pre-defined machine learning lifecycle tasks (e.g., tasks 132, FIG. 1. In block 520, process 500 manages, by the computing device, executing a management-layer software layer (e.g., management layer 120, FIG. 1) for the multiple pre-defined machine learning lifecycle tasks. In block 530, process 500 generates and updates, by the computing device, a machine learning pipeline (e.g., pipeline 131, FIG. 1) using the management-layer software layer.

In some embodiments, process 500 may include the feature where the machine learning lifecycle tasks each containing code that executes a specific stage in the lifecycle of a machine learning model.

In one or more embodiments, process 500 may further include the feature of adding, by the computing device, new lifecycle tasks to the multiple pre-defined machine learning lifecycle tasks. In some embodiments, process 500 may additionally include that the computing device monitors external dependencies, and launches pipelines containing a subset of the machine learning lifecycle tasks that updates machine learning model instances as required In some embodiments, process 500 may include the feature where a machine learning model lifecycle configuration specifies a set of the new lifecycle tasks, that generates an end-to-end lifecycle for a particular machine learning model instance.

In one or more embodiments, process 500 may additionally include the feature that a lifecycle operator process orchestrates execution of the plurality of pre-defined machine learning tasks, pipelines and triggers that manage one or more machine learning model instances.

In some embodiments, process 500 may further include the feature that the lifecycle operator process manages a plurality of model versions for each managed machine learning model instance.

In one or more embodiments, process 500 may include the feature that the machine learning model lifecycle configuration is constructed from a pre-build lifecycle template and composed of pre-build lifecycle tasks.

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 6:
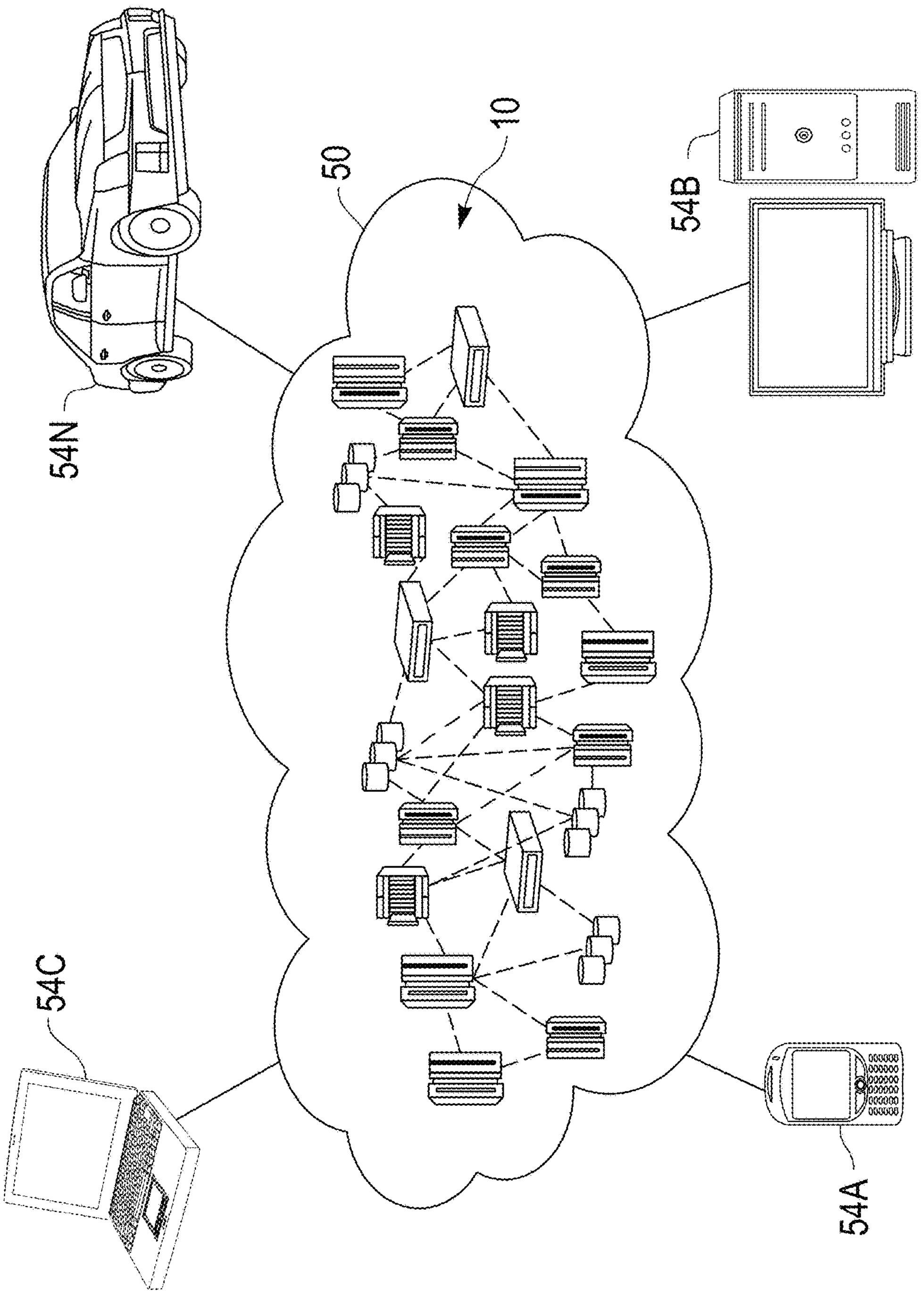
FIG. 6 depicts a cloud computing environment, according to an embodiment.

Referring now to FIG. 6 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
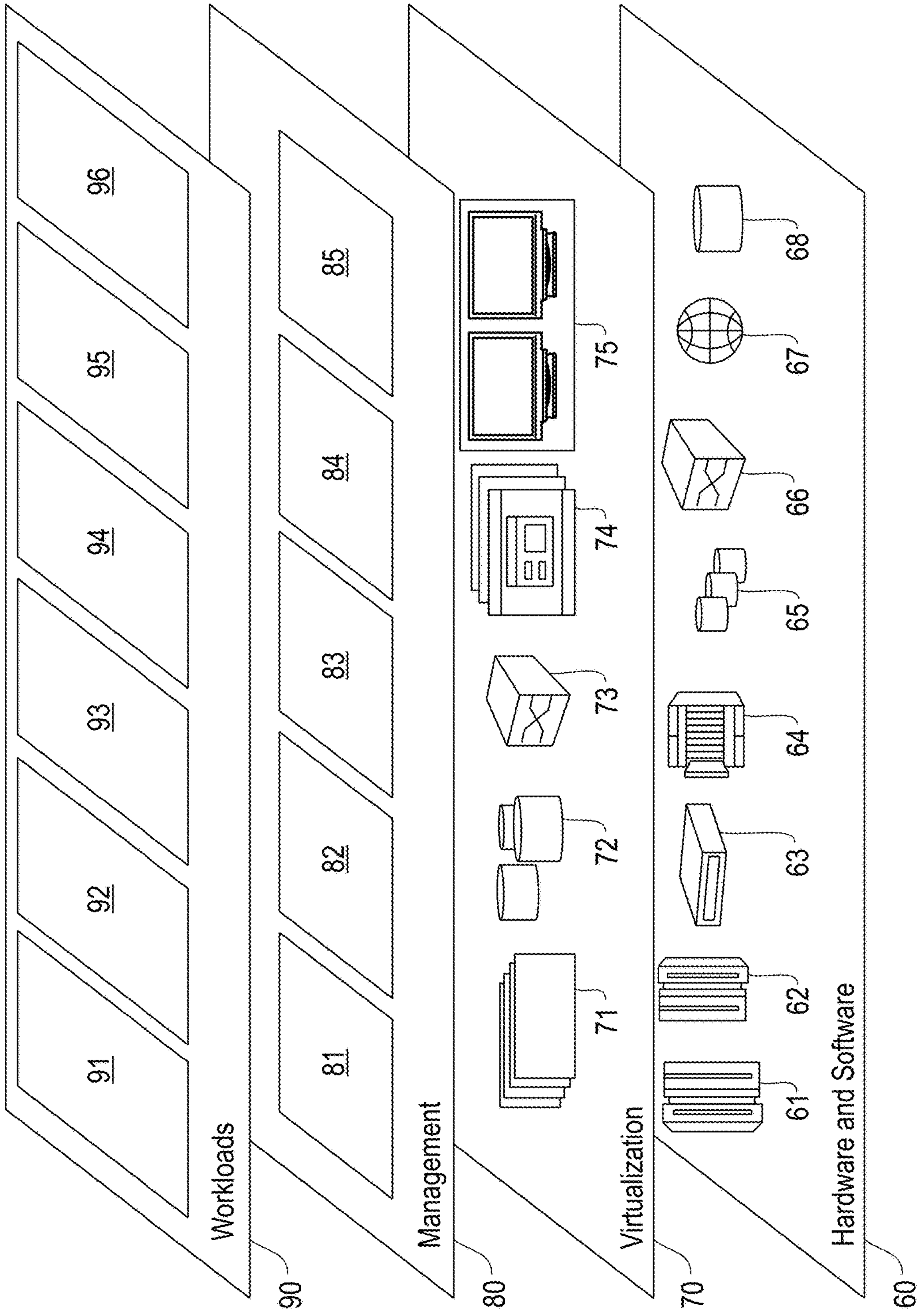
FIG. 7 depicts a set of abstraction model layers, according to an embodiment.

Referring now to FIG. 7, a set of functional abstraction layers provided by the cloud computing environment 50 (FIG. 6) is shown. It should be understood in advance that the components, layers, and functions shown in FIG. 7 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for using computing device to manage a lifecycle of machine learning models processing 96 (see, e.g., flow 100, FIG. 1, flow 200, FIG. 2, flow 300, FIG. 3, process 500, FIG. 5, system 800, FIG. 8, system 900, FIG. 9, system 1000, FIG. 10, etc.). As mentioned above, all of the foregoing examples described with respect to FIG. 7 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 8:
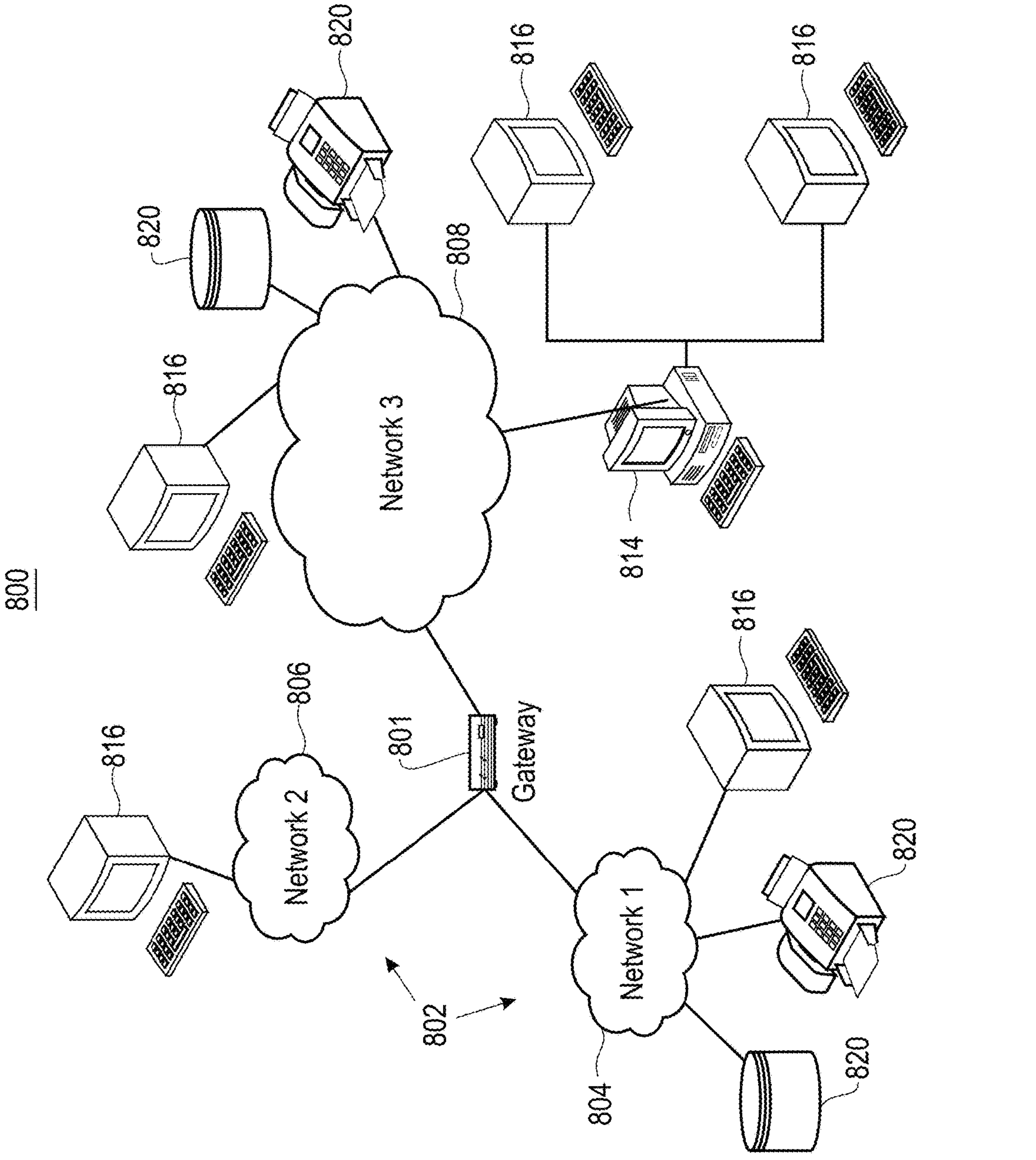
FIG. 8 is a network architecture of a system for using a computing device to manage a lifecycle of machine learning models, according to an embodiment.

FIG. 8 is a network architecture of a system 800 for using natural language software to respond to a Boolean question and automatically providing evidence and providing more fine-grained answers to Boolean questions, according to an embodiment. As shown in FIG. 8, a plurality of remote networks 802 are provided, including a first remote network 804 and a second remote network 806. A gateway 801 may be coupled between the remote networks 802 and a proximate network 808. In the context of the present network architecture 800, the networks 804, 806 may each take any form including, but not limited to, a LAN, a WAN, such as the Internet, public switched telephone network (PSTN), internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, laptop computer, handheld computer, printer, and/or any other type of logic-containing device. It should be noted that a user device 816 may also be directly coupled to any of the networks in some embodiments.

A peripheral 820 or series of peripherals 820, e.g., facsimile machines, printers, scanners, hard disk drives, networked and/or local storage units or systems, etc., may be coupled to one or more of the networks 804, 806, 808. It should be noted that databases and/or additional components may be utilized with, or integrated into, any type of network element coupled to the networks 804, 806, 808. In the context of the present description, a network element may refer to any component of a network.

According to some approaches, methods and systems described herein may be implemented with and/or on virtual systems and/or systems, which emulate one or more other systems, such as a UNIX® system that emulates an IBM® z/OS environment, a UNIX® system that virtually hosts a MICROSOFT® WiNDOWS® environment, a MICROSOFT® WINDOWS® system that emulates an IBM® z/OS environment, etc. This virtualization and/or emulation may be implemented through the use of VMWARE® software in some embodiments.

Figure 9:
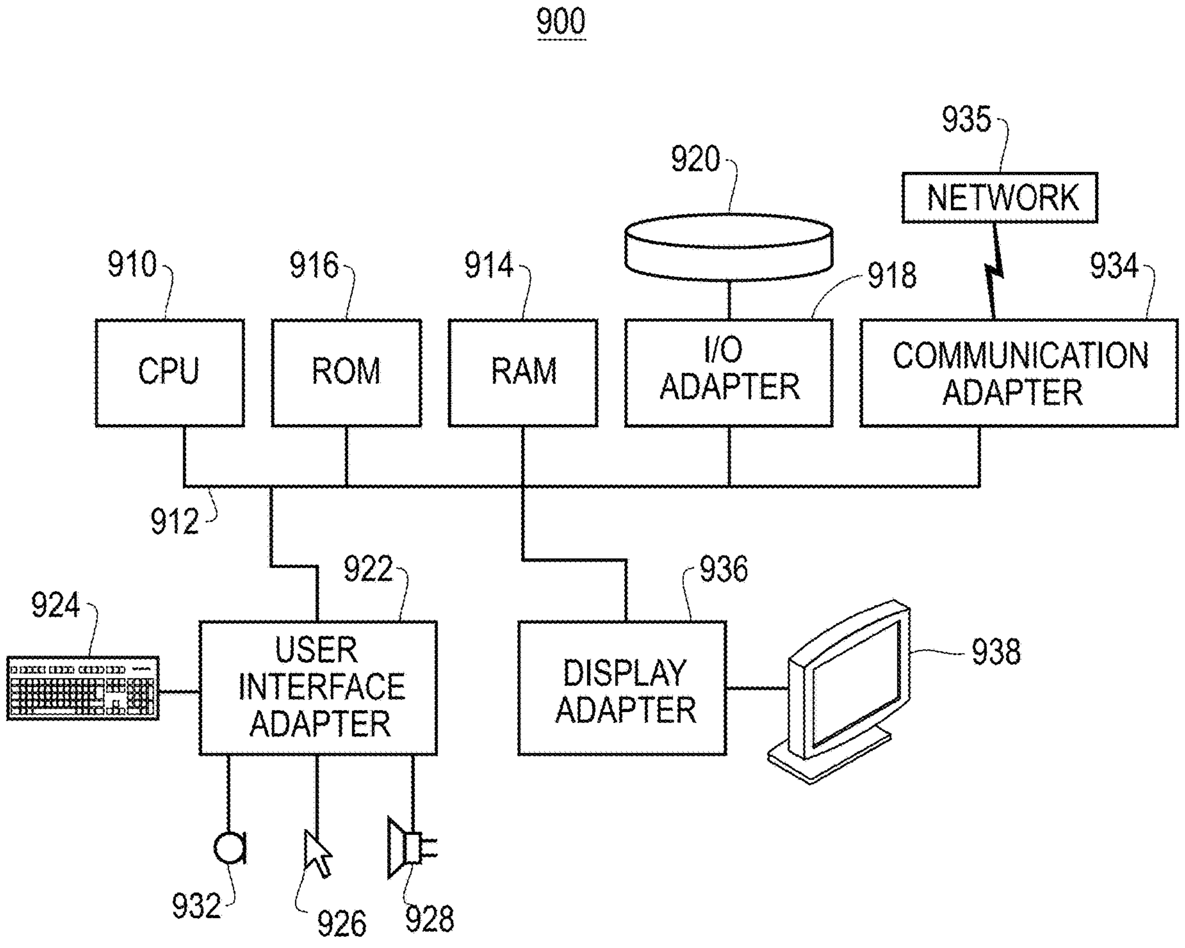
FIG. 9 shows a representative hardware environment that may be associated with the servers and/or clients of FIG. 6, according to an embodiment.

FIG. 9 shows a representative hardware system 900 environment associated with a user device 816 and/or server 814 of FIG. 8, in accordance with one embodiment. In one example, a hardware configuration includes a workstation having a central processing unit 910, such as a microprocessor, and a number of other units interconnected via a system bus 912. The workstation shown in FIG. 9 may include a Random Access Memory (RAM) 914, Read Only Memory (ROM) 916, an I/O adapter 918 for connecting peripheral devices, such as disk storage units 920 to the bus 912, a user interface adapter 922 for connecting a keyboard 924, a mouse 926, a speaker 928, a microphone 932, and/or other user interface devices, such as a touch screen, a digital camera (not shown), etc., to the bus 912, communication adapter 934 for connecting the workstation to a communication network 935 (e.g., a data processing network) and a display adapter 936 for connecting the bus 912 to a display device 938.

In one example, the workstation may have resident thereon an operating system, such as the MICROSOFT® WINDOWS® Operating System (OS), a MAC OS®, a UNIX® OS, etc. In one embodiment, the system 900 employs a POSIX® based file system. It will be appreciated that other examples may also be implemented on platforms and operating systems other than those mentioned. Such other examples may include operating systems written using JAVA®, XML, C, and/or C++ language, or other programming languages, along with an object oriented programming methodology. Object oriented programming (OOP), which has become increasingly used to develop complex applications, may also be used.

Figure 10:
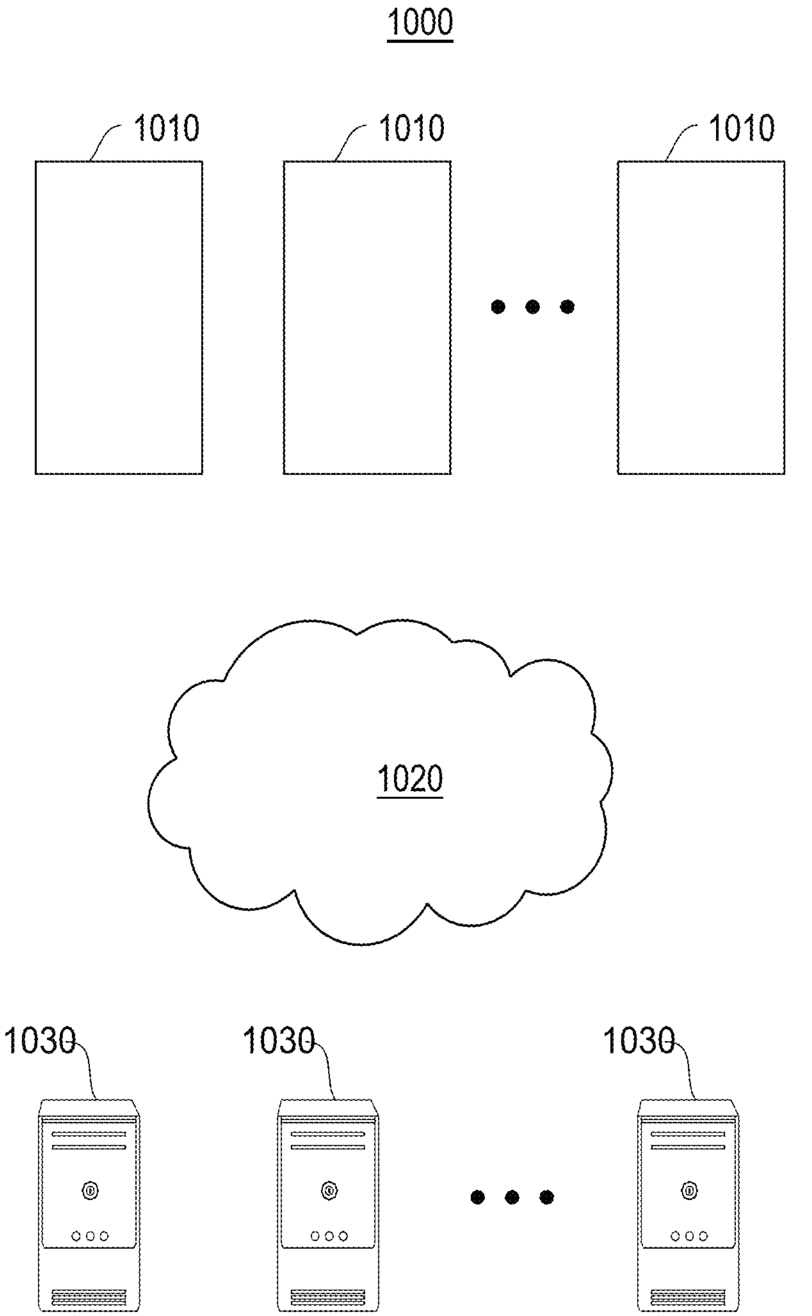
FIG. 10 is a block diagram illustrating a distributed system for using a computing device to manage a lifecycle of machine learning models, according to one embodiment.

FIG. 10 is a block diagram illustrating a distributed system 1000 for using natural language software to respond to a Boolean question and automatically providing evidence and providing more fine-grained answers to Boolean questions, according to one embodiment. In one embodiment, the system 1000 includes client devices 1010 (e.g., mobile devices, smart devices, computing systems, etc.), a cloud or resource sharing environment 1020 (e.g., a public cloud computing environment, a private cloud computing environment, a data center, etc.), and servers 1030. In one embodiment, the client devices 1010 are provided with cloud services from the servers 1030 through the cloud or resource sharing environment 1020.

One or more embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method of using a computing device to manage a lifecycle of machine learning models, the method comprising:
- receiving, by a computing device, a plurality of pre-defined machine learning lifecycle tasks that represent stages in the lifecycle of the machine learning models, wherein inputs for pre-defined machine learning lifecycle tasks are provided by outputs of preceding pre-defined machine learning lifecycle tasks from the plurality of pre-defined machine learning lifecycle tasks;
- managing, by the computing device, execution of a management-layer software layer for the plurality of pre-defined machine learning lifecycle tasks;
- generating and updating, by the computing device, a machine learning pipeline using the management-layer software layer;
- adding, by the computing device, new lifecycle tasks to the plurality of pre-defined machine learning lifecycle tasks;
- monitoring, by the computing device, external dependencies; and
- launching, by the computing device, pipelines containing a subset of the machine learning lifecycle tasks, wherein the launched pipelines update machine learning model instances, and wherein the updates generate an end-to-end lifecycle of the machine learning model instances associated with a corresponding desired state.

2. The method of claim 1, wherein each machine learning lifecycle task from the plurality of pre-defined machine learning lifecycle tasks comprises code that executes a specific stage in the lifecycle of a machine learning model.

3. The method of claim 1, wherein a machine learning model lifecycle configuration specifies a set of new lifecycle tasks, that generates an end-to-end lifecycle for a particular machine learning model instance.

4. The method of claim 3, wherein a lifecycle operator process orchestrates execution of the plurality of pre-defined machine learning tasks, pipelines and triggers that manage one or more machine learning model instances.

5. The method of claim 4, wherein the lifecycle operator process manages a plurality of model versions for each managed machine learning model instance.

6. The method of claim 5, wherein the machine learning model lifecycle configuration is constructed from a pre-build lifecycle template and composed of pre-build lifecycle tasks.

7. A computer program product for managing a lifecycle of machine learning models, the computer program product comprising a computer readable storage medium having program instructions embodied therewith, the program instructions executable by a processor to cause the processor to:
- receive, by the processor, a plurality of pre-defined machine learning lifecycle tasks that represent stages in the lifecycle of the machine learning models, wherein inputs for pre-defined machine learning lifecycle tasks are provided by outputs of preceding pre-defined machine learning lifecycle tasks from the plurality of pre-defined machine learning lifecycle tasks;
- manage, by the processor, execution of a management-layer software layer for the plurality of pre-defined machine learning lifecycle tasks;
- generate and update, by the processor, a machine learning pipeline using the management-layer software layer;
- adding, by the processor, new lifecycle tasks to the plurality of pre-defined machine learning lifecycle tasks;
- monitoring, by the processor, external dependencies; and
- launching, by the processor, pipelines containing a subset of the machine learning lifecycle tasks, wherein the launched pipelines update machine learning model instances, and wherein the updates generate an end-to-end lifecycle of the machine learning model instances associated with a corresponding desired state.

8. The computer program product of claim 7, wherein each machine learning lifecycle task from the plurality of pre-defined machine learning lifecycle tasks comprises code that executes a specific stage in the lifecycle of a machine learning model.

9. The computer program product of claim 7, wherein a machine learning model lifecycle configuration specifies a set of new lifecycle tasks, that generates an end-to-end lifecycle for a particular machine learning model instance.

10. The computer program product of claim 9, wherein a lifecycle operator process orchestrates execution of the plurality of pre-defined machine learning tasks, pipelines and triggers that manage one or more machine learning model instances.

11. The computer program product of claim 10, wherein the lifecycle operator process manages a plurality of model versions for each managed machine learning model instance.

12. The computer program product of claim 11, wherein the machine learning model lifecycle configuration is constructed from a pre-build lifecycle template and composed of pre-build lifecycle tasks.

13. An apparatus comprising:
- a memory configured to store instructions; and
- a processor configured to execute the instructions to:
  - receive a plurality of pre-defined machine learning lifecycle tasks that represent stages in lifecycle of machine learning models, wherein inputs for pre-defined machine learning lifecycle tasks are provided by outputs of preceding pre-defined machine learning lifecycle tasks from the plurality of pre-defined machine learning lifecycle tasks;
  - manage execution of a management-layer software layer for the plurality of pre-defined machine learning lifecycle tasks;
  - generate and update a machine learning pipeline using the management-layer software layer;
  - add new lifecycle tasks to the plurality of pre-defined machine learning lifecycle tasks;
  - monitor external dependencies; and
  - launch pipelines containing a subset of the machine learning lifecycle tasks, wherein the launched pipelines update machine learning model instances, and wherein the updates generate an end-to-end lifecycle of the machine learning model instances associated with a corresponding desired state.

14. The apparatus of claim 13, wherein each machine learning lifecycle task from the plurality of pre-defined machine learning lifecycle tasks comprises code that executes a specific stage in the lifecycle of a machine learning model.

15. The apparatus of claim 13, wherein a machine learning model lifecycle configuration specifies a set of new lifecycle tasks, that generates an end-to-end lifecycle for a particular machine learning model instance.

16. The apparatus of claim 15, wherein a lifecycle operator process orchestrates execution of the plurality of predefined machine learning tasks, pipelines and triggers that manage one or more machine learning model instances.

17. The apparatus of claim 16, wherein the lifecycle operator process manages a plurality of model versions for each managed machine learning model instance, and the machine learning model lifecycle configuration is constructed from a pre-build lifecycle template and composed of pre-build lifecycle tasks.

* * * * *